United States Patent [19]

Furusawa et al.

[11] Patent Number: 4,670,498

[45] Date of Patent: Jun. 2, 1987

[54] POLYESTER BLOCK COPOLYMER COMPOSITION

[75] Inventors: Hironobu Furusawa; Tadao Taika, both of Otsu, Japan

[73] Assignee: Toyo Boseki Kabushiki Kaisha, Osaka, Japan

[21] Appl. No.: 795,136

[22] Filed: Nov. 5, 1985

[30] Foreign Application Priority Data

Nov. 7, 1984 [JP] Japan ................. 59-234562

[51] Int. Cl.$^4$ .................. C08K 5/05; C08L 67/02
[52] U.S. Cl. .................... 524/381; 524/382; 524/539; 524/605; 525/444; 525/448
[58] Field of Search ............... 524/381, 382, 539, 605; 525/448, 444

[56] References Cited

U.S. PATENT DOCUMENTS

| 3,484,400 | 12/1969 | Halek | 524/381 |
| 3,546,320 | 12/1970 | Duling | 525/444 |
| 3,907,926 | 9/1975 | Brown | 524/539 |
| 4,336,343 | 6/1982 | Aharoni | 524/381 |

FOREIGN PATENT DOCUMENTS

| 47-43619 | 11/1972 | Japan | 524/381 |
| 57-96057 | 6/1982 | Japan | 524/381 |
| 58-194937 | 11/1983 | Japan | 524/381 |

Primary Examiner—C. Warren Ivy

[57] ABSTRACT

A polyester block copolymer composition comprising 100 parts by weight of a polyester block copolymer and 0.05 to 10 parts by weight of a metal alcoholate of the formula: $M(OR)_n$, wherein M is a metal of the groups I to III in periodic table, R is a hydrocarbon group having 1 to 20 carbon atoms, and n is 1 to 3, said polyester block copolymer composition having improved melt properties and being suitable for producing various shaped articles by extrusion molding.

5 Claims, No Drawings

POLYESTER BLOCK COPOLYMER COMPOSITION

The present invention relates to a polyester block copolymer composition, more particularly, to a polyester block copolymer composition having improved melt properties suitable for the extrusion molding thereof to form various shaped articles such as blow shaped articles, tube-like products or sheet-like products.

PRIOR ART

It is known that polyester block copolymers comprising a hard segment consisting of a polyester (e.g. polybutylene terephthalate) and a soft segment consisting of a polyether (e.g. poly(tetramethyleneoxide)glycol) or an aliphatic polyester (e.g. poly-ε-caprolactone) have excellent mechanical characteristics (e.g. excellent elastic recovery and flexibility) and excellent high-temperature characteristics and they have been widely used for various utilities such as packings and bushings. However, these polyester block copolymers produced by a melt polycondensation method have a comparatively lower melt viscosity and hence are not suitable for extrusion blow molding to produce tube- or sheet-like products or blow shaped vessels, because extrusion molding requires a high melt viscosity for the material and hence the copolymers having a lower melt viscosity show inferior molding properties.

The present inventors have already proposed the incorporation of a small amount of an alkali metal salt of a dimer acid into a polyester block copolymer in order to increase the melt viscosity of the copolymer and thereby improve effectively the melt properties of the copolymer (cf Japanese Patent First Publication No. 28151/1982). Similar proposal has also been made in U.S. Pat. No. 4,362,836.

Besides, it has also been proposed to produce the desired copolymer by subjecting a polyester block copolymer to a solid phase polymerization at a temperature below the melting point thereof (cf. Japanese Patent Second Publication No. 30999/1977).

However, these methods pose some problems from the practical viewpoint. For instance, in the method of increasing of melt viscosity by solid phase polymerization of polyester block copolymer, it usually takes a very long period of time such as 10 hours or longer and further it is very difficult to control the reaction and to ensure uniform reaction. Besides, although the method of incorporating an alkali metal salt of a fatty acid having a long chain into the polyester block copolymer is convenient, it is necessary to add the metal salt in a comparatively large amount such as about 2 parts by weight per 100 parts by weight of the polymer in order to increase the melt viscosity to a degree suitable for blow molding, and further, the alkali metal salt of the long chain fatty acid is soluble in water and is also soluble in organic solvents, and hence, when the resin composition is used for the production of a tube for a hydraulic hose by tubing thereof, the salt is dissolved out into the oil which give bad effect on the oil durability, and when the resin composition is used for the production of a water tube, the salt is dissolved out into water which induces pollution of the water. Moreover, when shaped articles produced from the resin composition are kept in air, surface of the shaped articles becomes wet and sticky because of moisture absorption of the alkali metal salt.

BRIEF EXPLANATION OF THE INVENTION

The present inventors have intensively studied various compositions of polyester block copolymers in order to obtain a composition which shows improved melt properties with less extractability and can give shaped products having excellent appearence, and have found that the desired polyester block copolymer composition can be obtained by incorporating a metal alcoholate into the polyester block copolymer.

An object of the invention is to provide a polyester block copolymer composition having improved melt properties and being suitable for producing shaped articles by extrusion molding. This and other objects and advantages of the invention will be apparent to those skilled in the art from the following description.

DETAILED EXPLANATION OF THE INVENTION

The polyester block copolymer composition of the present invention comprises 100 parts by weight of a polyester block copolymer (I) and 0.05 to 10 parts by weight of a metal alcoholate (II) of the formula: $M(OR)_n$ wherein M is a metal of the groups I to III in periodic table, R is a hydrocarbon group having 1 to 20 carbon atoms, such as an alkyl having 1 to 20 carbon atoms and an aralkyl having 7 to 20 carbon atoms, and n is 1 to 3.

The polyester block copolymer used in the present invention comprises (A) a crystalline segment having a high melting point which comprises predominantly an aromatic polyester unit and (B) a polymer segment having a low melting point which comprising predominantly an aliphatic polyether unit (a) and/or an aliphatic polyester unit (b).

The crystalline segment having a high melting point (A) is a hard segment composed of a polyester and the ester unit thereof consists of an acid component and a glycol component. The acid component is substantially composed of terephthalic acid and/or 2,6-naphthalenedicarboxylic acid. The acid component may optionally include a small amount of other aromatic dicarboxylic acid (e.g. isophthalic acid, etc.) and/or an aliphatic dicarboxylic acid (e.g. adipic acid, sebacic acid, cyclohexane-1,4-dicarboxylic acid, dimer acid, etc.). However, in order to keep the desired moldability and rate of crystallization of the polymer, the acid component should be composed of at least 70% by mole of terephthalic acid or 2,6-dinaphthalenedicarboxylic acid in the whole acid component.

The glycol component in the ester unit is composed of a glycol having 2 to 12 carbon atoms, such as ethylene glycol, propylene glycol, tetramethylene glycol, neopentyl glycol, hexanediol, decanediol, and the like. In order to keep the desired moldability and rate of crystallization of the polymer, the glycol component should be composed of at least 70% by mole of the same glycol in the whole glycol component.

The crystalline segment having a high melting point is not specified as to the melting point, but it is preferable that the polymer produced from the crystalline segment alone has a melting point of not lower than 150° C., more preferably not lower than 180° C.

The polymer segment having a low melting point (B) is a soft segment and the ether unit (a) thereof is composed of a polyalkylene glycol. The polyalkylene glycol includes polyethylene glycol, polypropylene glycol, polytetramethylene glycol, polyethylene glycol-polypropylene glycol copolymer, and the like, particularly preferably polytetramethylene glycol. These glycols may be used alone or in combination of two or more thereof, but the ratio of carbon number to oxygen number is in the range of 2.0 to 4.5. The polymer segment having a low melting point has a molecular weight of about 400 to 6,000.

The aliphatic polyester unit (b) in the polymer segment having a low melting point is predominantly composed of an aliphatic dicarboxylic acid and a glycol. The acid component includes aliphatic dicarboxylic acids such as succinic acid, adipic acid, sebacic acid, decanedicarboxylic acid and the like. The acid component may optionally include a small amount of an aromatic dicarboxylic acid (e.g. isophthalic acid). The glycol component composing the aliphatic polyester unit (b) is a glycol having 2 to 12 carbon atoms and includes the same glycols as those included in the ester unit of the crystalline segment having a high melting point (A) as mentioned above.

The aliphatic polyester unit (b) may be homopolyesters and copolyesters which can be prepared by polycondensing the above acid component and glycol component in a usual manner; or may be polylactones (e.g. poly-$\epsilon$-caprolactone) which can be prepared by subjecting a cyclic lactone to a ring opening polymerization.

The polymer segment having a low melting point is not specified as to the melting point, but the polymer segment alone preferably has a melting point of not higher than 130° C., more preferably not higher than 100° C.

The hard segment (A) and the soft segment (B) in the polyester block copolymer are preferably contained in a ratio of 95:5 to 5:95 by weight, more preferably 70:30 to 30:70. The block copolymer is preferably an elastomer having a softening point of not lower than 100° C.

Preferred polyester block copolymers used in the present invention are copolymers comprising a hard segment (A) selected from polytetramethylene terephthalate, polytrimethylene terephthalate and polytetramethylene-2,6-naphthalate and a soft segment (B) selected from polytetramethylene glycol or an aliphatic polyester (e.g. polytetramethylene adipate and poly-$\epsilon$-caprolactone).

Besides, the copolymer may be copolymerized with a polycarboxylic acid, a polyfunctional hydroxy compound or an oxyacid as a part of the dicarboxylic acid and glycol components. The polyfunctional compounds are effective as a component for giving a high melt viscosity to the copolymer, and are copolymerized in the range of not more than 3% by mole. The polyfunctional component includes trimellitic acid, trimesic acid, pyromellitic acid, benzophenonetetracarboxylic acid, butanetetracarboxylic acid, glycerin, pentaerythritol, and esters or acid anhydride thereof.

The polyester block copolymer can be prepared by conventional methods, for instance, by reacting dimethyl terephthalate, polytetramethylene glycol and tetramethylene glycol in the presence of an ester exchange catalyst and distilling the resulting prepolymer under reduced pressure to remove excess tetramethylene glycol, and thereby obtaining a polymer having a high molecular weight. Besides, the polyester block copolymer comprising a crystalline segment having a high melting point (A) (ester units) and an aliphatic polyester unit (b) having a low melting point can be prepared, for example, by preparing separately polybutylene terephthalate and polyethylene adipate by a conventional polymerization method, and melt-mixing the polymers so that they are block-copolymerized.

The metal alcoholate (II) used in the present invention is a compound of the formula: $M(OR)_n$ wherein M is a metal of the groups I to III in the periodic table, R is a hydrocarbon group having 1 to 20 carbon atoms (e.g. an alkyl having 1 to 20 carbon atoms and an aralkyl having 7 to 20 carbon atoms), and n is 1 to 3, which is prepared by replacing the hydrogen atom in a monovalent alcohol (ROH) with a metal (M). The monovalent alcohol (ROH) is not specified but is preferably a lower monovalent alcohol having a comparatively lower boiling point. The monovalent alcohol includes an aliphatic saturated alcohol having a boiling point of not higher than 150° C., specifically methyl alcohol, ethyl alcohol, propyl alcohol, butyl alcohol and amyl alcohol. In view of the degree of inactivity of the ester bond (i.e. prevention of alcoholysis with the polyester copolymer), secondary or tertiary alcohols such as isopropyl alcohol, sec-butyl alcohol, and tert-butyl alcohol are also particulary preferable. The metal (M) includes sodium, potassium, calcium, aluminum, and the like.

Suitable examples of the metal alcoholate (II) are sodium ethoxide, potassium butoxide, calcium ethoxide, aluminum triisopropoxide, aluminum tri-sec-butoxide, and aluminum tri-tert-butoxide, but it is not limited thereto. These metal alcoholate may be used alone or in combination of two or more thereof. Among these metal alcoholates, aluminum alcoholates which are easily soluble in organic solvents and have no moisture absorption are particularly preferable in view of easy handling in admixing with the polyester copolymer and water repellency after being mixed into the copolymer.

The polyester elastomer composition of the present invention contains 0.05 to 10% by weight, preferably 0.1 to 5.0% by weight, of the metal alcoholate. When the metal alcoholate is contained in an amount of less than 0.05% by weight, the melt viscosity of the composition is insufficiently improved, and on the other hand, when the amount of the metal alcoholate is over 10% by weight, the melt properties of the polymer are disadvantageously significantly impaired.

Mixing of the polyester block copolymer and the metal alcoholate can be done by any conventional method, but is conveniently done by melt-mixing with an extruder and the like. When an extruder provided with a vent is used, the mixing is particularly advantageously carried out because the alcohol can rapidly be removed from the reaction system. The metal alcoholate may be added as it stands or in the form of a solution in a solvent.

The composition of this invention may optionally include additives such as stabilizers (e.g. hindered phenol, sulfur stabilizers, amine stabilizers, triazole stabilizers), nucleating agents, lubricants, reinforcing agents (e.g. glass fibers), soaps, waxes, dyes, pigments, and the like.

The composition may also be blended with other resins such as polytetramethylene terephthalate unless the properties of the polyester block copolymer are impaired.

According to the present invention, the alcoholate reacts with the terminal carboxyl group of the polyester block copolymer during extruding, whereby an alcohol is taken out from the reaction system and the metal ion is directly bound to the polyester block copolymer, and hence, there is no inorganic residue which is extracted during storage as in the conventional compositions. It has been found that when a metal alcoholate is mixed with the copolymer in an amount equivalent to the number of the terminal carboxyl groups of the copolymer, there is obtained the most stable composition having a high melt viscosity. When a metal alcoholate is made from a lower primary alcohol which is easily taken out from the system, it can be used in a smaller amount because of the smaller molecular weight and further can more surely be bound to the terminal of the polymer.

Besides, among aluminum alcoholates, aluminum tri-sec-butoxide is liquid, and hence, it is preferable because of easy handling thereof. Metal alcoholates are usually easily decomposed by water and hence are preferably used in a solution in a water repellent solvent. In this embodiment, aluminum alcoholates are preferably used, because they can specifically be dissolved in organic solvents such as benzene and toluene.

The composition of the present invention has characteristics such as excellent melt properties and less extractability and further no tackiness of the surface thereof when formed into shaped articles, and hence, is useful for the production of various shaped articles by molding (e.g. blow molding and extrusion molding) to form blow shaped products, tube- and sheet-like shaped products, and the like.

The present invention is illustrated by the following Preparations, Examples and Reference Examples, but should not be construed to be limited thereto, wherein the "part" means part by weight unless specified otherwise.

In the Preparations, Examples and Reference Examples, the properties of the products are measured in the following manner.

Reduced specific viscosity ($\eta sp/c$) is measured in a solution of the test sample (200 mg) in a solvent (100 ml) of phenol/tetrachloroethane (60 parts/40 parts) at 30° C.

The melt viscosity of the polymer composition is shown by melt index (MI) as disclosed in Japan Industry Standards (JIS) K 7210, which is measured by counting the amount of the polymer which flows out during 10 minutes at 230° C. under a load of 2160 g with a tester, wherein the amount of the polymer is shown in gram number thereof.

PREPARATION 1

Preparation of polyester block copolymer A

Dimethyl terephthalate (DMT) (970 parts), 1,4-butanediol (BD) (1,000 parts) and polytetramethylene glycol (PTMG) having a molecular weight of 1,000 (1,000 parts) are polymerized by using titanium tetrabutoxide (2 parts) as a catalyst in a usual manner to give a polyester block copolymer having 50% PTMG content (Polymer A).

The Polymer A has a reduced specific viscosity ($\eta sp/c$) of 2.02 and the number of terminal carboxyl groups of 55 milliequivalent/1 kg of polymer.

PREPARATION 2

Preparation of polyester block copolymer B

DMT (2,700 parts), dimethyl isophthalate (DMI) (1,000 parts), ethylene glycol (EG) (2,400 parts) and PTMG having a molecular weight of 1,000 (1,000 parts) are polymerized by using zinc acetate/antimony trioxide (2.5 parts/2.5 parts) as a catalyst in a usual manner to give a polyester block copolymer having 30% PTMG content (Polymer B).

The polymer B has a reduced specific viscosity ($\eta sp/c$) of 1.50 and the number of terminal carboxyl groups of 60 milliequivalent/1 kg of polymer.

PREPARATION 3

Preparation of polyester block copolymer C

Polybutylene terephthalate (solution viscosity ($\eta sp/c$)=1.20) (1,000 parts) is molten under nitrogen gas at 240° C., and thereto is added ε-caprolactone (2,000 parts), and the mixture is stirred for 2 hours to give a polybutylene terephthalate-poly-ε-caprolactone block copolymer having 66% poly-ε-caprolactone content (Polymer C).

The Polymer C has a reduced specific viscosity ($\eta sp/c$) of 1.80 and the number of terminal carboxyl groups of 65 milliequivalent/1 kg of polymer.

PREPARATION 4

Preparation of polyester block copolymer D 2,6-Dimethylnaphthalate (1,200 parts), 1,4-butanediol (1,200 parts) and polytetramethylene glycol having a molecular weight of 2,000 (1,000 parts) are polymerized by using titanium butoxide (2 parts) as a catalyst in a usual manner to give a polyester block copolymer having 44% PTMG content (Polymer D).

The Polymer D has a reduced specific viscosity ($\eta sp/c$) of 1.74 and the number of terminal carboxyl groups of 42 milliequivalent/1 kg of polymer.

EXAMPLES 1-6 AND REFERENCE EXAMPLES 1-5

Polymers A, B and C are each mixed with various metal alcoholates in various ratios as shown in Table 1.

The mixing is carried out by directly adding a metal alcoholate (as a powder or in a solution) to the Polymer A, B or C and kneading the mixture with a uniaxial extruder provided with a vent ($\phi$: 40 mm, L/D=30) at 220° C. and at an extrusion speed of 7 kg/hour.

For references, Polymers A, B and C are used without adding any metal alcoholate (i.e. merely passing the polymers through the extruder) and a composition is obtained by kneading Polymer A with disodium dimerate.

Measurement of solution viscosity and extraction properties

The compositions were dried at 100° C. for 4 hours, and then MI thereof was measured. The results are shown in Table 1.

Observation of tackiness of surface of shaped article

The composition was dried at 100° C. for 4 hours and was molded with an injection molding machine to prepare a panel (100 mm square, 2 mm thickness). The panel was kept in an atmosphere of 70% RH (relative humidity) and 30° C. for one week, and then the tackiness of the surface thereof was observed. The results are shown in Table 1.

Measurement of solution viscosity ($\eta sp/c$) of the composition

After mixing with an extruder (in respect to a reference, after passing the polymer through the extruder), the solution viscosity ($\eta sp/c$) of the sample was measured, and thereby, the variation of the molecular weight in the base polymers A, B and C was measured. The results are shown in Table 1.

TABLE 1

|  | Ref. Ex. 1 | Ex. 1 | Ex. 2 | Ex. 3 | Ex. 4 | Ref. Ex. 2 | Ref. Ex. 3 | Ref. Ex. 4 | Ex. 5 | Ref. Ex. 5 | Ex. 6 |
|---|---|---|---|---|---|---|---|---|---|---|---|
| Polymer (part) | A (100) | A (100) | A (100) | A (100) | A (100) | A (100) | A (100) | B (100) | B (100) | C (100) | C (100) |
| Additives (part) | None | Sodium ethoxide (0.4) | Aluminum tri-sec-butoxide (0.5) | Aluminum tri-iso-propoxide (0.3) | Aluminum tri-ios-propoxide (0.5) | Disodium dimerate (2.0) | Disodium dimerate (0.5) | None | Aluminum tri-sec-butoxide (0.5) | None | Aluminum tri-sec-butoxide (0.5) |
| MI | 18 | 8 | 3 | 10 | 4 | 5 | 16 | 21 | 5 | 26 | 6 |
| Amount of extract with boiling water (%) | 0.02* | 0.02* | 0.02* | 0.02* | 0.02* | 2.10** | 0.52** | 0.04* | 0.04* | 0.12* | 0.12* |
| Tackiness of surface of shaped article | None | None | None | None | None | Observed | Slightly observed | None | None | None | None |
| ηsp/c | 1.96 | 1.90 | 1.97 | 1.94 | 1.95 | 1.92 | 1.96 | 1.48 | 1.49 | 1.75 | 1.75 |

[Remarks]:
* When the extract was analyzed by an infrared analysis, it was polyester oligomer.
**When the extract was analyzed by an infrared analysis, it was predominantly disodium dimerate and included a slight amount of polyeser oligomer.

EXAMPLES 7-9 AND REFERENCE EXAMPLES 6 AND 7

Polymers A, B and D are each mixed with various metal alcoholates in various ratios as shown in Table 2 in the same manner as described in Examples 1-6 and Reference Examples 1-5.

As to the compositions thus obtained, the melt viscosity, extraction properties, tackiness of shaped articles, and solution viscosity were measured likewise. The results are shown in Table 2.

TABLE 2

|  | Ex. 7 | Ex. 8 | Ex. 9 | Ref. Ex. 6 | Ref. Ex. 7 |
|---|---|---|---|---|---|
| Polymer (part) | A (100) | D (100) | A (100) | A (100) | B (100) |
| Additives (part) | Calcium ethoxide (0.5) | Aluminum tri-sec-butoxide (0.4) | Aluminum tri-iso-propoxide (2.0) | Aluminum tri-iso-propoxide (0.03) | Aluminum tir-sec-butoxide (15) |
| MI | 14 | 2 | 8 | 18 | 59 |
| Amount of extract with boiling water (%) | 0.03 | 0.02 | 0.05 | 0.02 | 3.5 |
| Tackiness of surface of shaped article | None | None | None | None | None |
| ηsp/c | 1.88 | 1.70 | 1.86 | 1.95 | 1.04 |

What is claimed is:

1. A polyester block copolymer composition which comprises 100 parts by weight of a polyester block copolymer comprising (A) a crystalline segment having a high melting point and (B) a polymer segment having a low melting point, wherein the polymer produced from said crystalline segment having a high melting point alone has a melting point of not lower than 150° C. and the polymer segment having a low melting point alone has a melting point of not higher than 130° C., said crystalline segment having a high melting point being a member selected from the group consisting of polytetramethylene terephthalate, polytrimethylene terephthalate and polytetramethylene-2,6-naphthalate and said polymer segment having a low melting point being a member selected from the group consisting of polytetramethylene glycol, polytetramethylene adipate and poly-ε-caprolactone; and 0.05 to 10 parts by weight of a metal alcoholate of the formula: $M(OR)_n$ wherein M is a metal of the groups I to III in the periodic table, R is a hydrocarbon group having 1 to 20 carbon atoms, and n is 1 to 3.

2. The composition according to claim 1, wherein the metal alcoholate is a salt of a monovalent alcohol selected from the group consisting of methyl alcohol, ethyl alcohol, propyl alcohol, isopropyl alcohol, butyl alcohol, sec-butyl alcohol, and tert-butyl alcohol with a metal selected from the group consisting of sodium, potassium, calcium and aluminum.

3. The composition according to claim 2, wherein the metal alcoholate is a member selected from the group consisting of sodium ethoxide, potassium butoxide, calcium ethoxide, aluminum triisopropoxide, aluminum tri-sec-butoxide, and aluminum tri-tert-butoxide.

4. The composition according to claim 2, wherein the metal alcoholate is an aluminum alcoholate.

5. The composition according to claim 4, wherein the aluminum alcoholate is a member selected from aluminum tri-sec-butoxide and aluminum-tri-tert-butoxide.

* * * * *

UNITED STATES PATENT AND TRADEMARK OFFICE
CERTIFICATE OF CORRECTION

PATENT NO. : 4,670,498
DATED : June 2, 1987
INVENTOR(S) : Hironobu Furusawa et al It is certified that error appears in the above-identified patent and that said Letters Patent is hereby corrected as shown below:

Claim 1 (column 7, line 65), after "and" there should be inserted --said polymer segment having a low melting point being a member selected from the group consisting of polytet- --

Signed and Sealed this

Eighth Day of September, 1987

Attest:

DONALD J. QUIGG

Attesting Officer

Commissioner of Patents and Trademarks